United States Patent [19]

Chapman

[11] 4,420,056

[45] Dec. 13, 1983

[54] POSTAGE SCALE

[76] Inventor: Lloyd Chapman, 1758 Fleetwood, Boulder City, Nev. 89005

[21] Appl. No.: 351,118

[22] Filed: Feb. 22, 1982

[51] Int. Cl.³ .......................................... G01G 19/54
[52] U.S. Cl. ...................................... 177/245; 177/251
[58] Field of Search .......................... 177/245, 246, 251

[56] References Cited

U.S. PATENT DOCUMENTS

| 1,622,924 | 3/1927 | Richie | 177/251 |
| 1,843,934 | 2/1932 | Stephens | 177/251 |
| 2,507,073 | 5/1950 | White | 177/251 |
| 2,612,365 | 9/1952 | Nielsen | 177/251 |
| 2,890,036 | 6/1959 | Stelzer | 177/251 X |

FOREIGN PATENT DOCUMENTS

| 424548 | 2/1935 | United Kingdom | 177/251 |
| 491380 | 8/1938 | United Kingdom | 177/245 |

Primary Examiner—Joseph W. Hartary
Attorney, Agent, or Firm—Edward J. Quirk

[57] ABSTRACT

A postage scale, which may also serve as a letter opener, has a substantially flat elongate body with grip means at one end thereof for holding a letter or similar article in perpendicularly depending position. The grip means preferably consists of a wide-mouthed slot termination in a bore through a central portion of the body. A plurality of ribs or equivalent balancing means is used to determine the weight of the article.

1 Claim, 3 Drawing Figures

U.S. Patent  Dec. 13, 1983  4,420,056
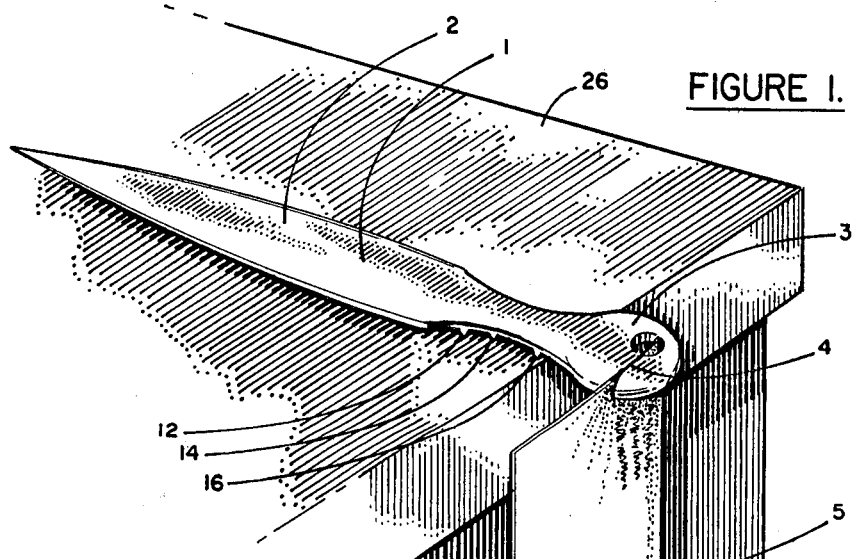
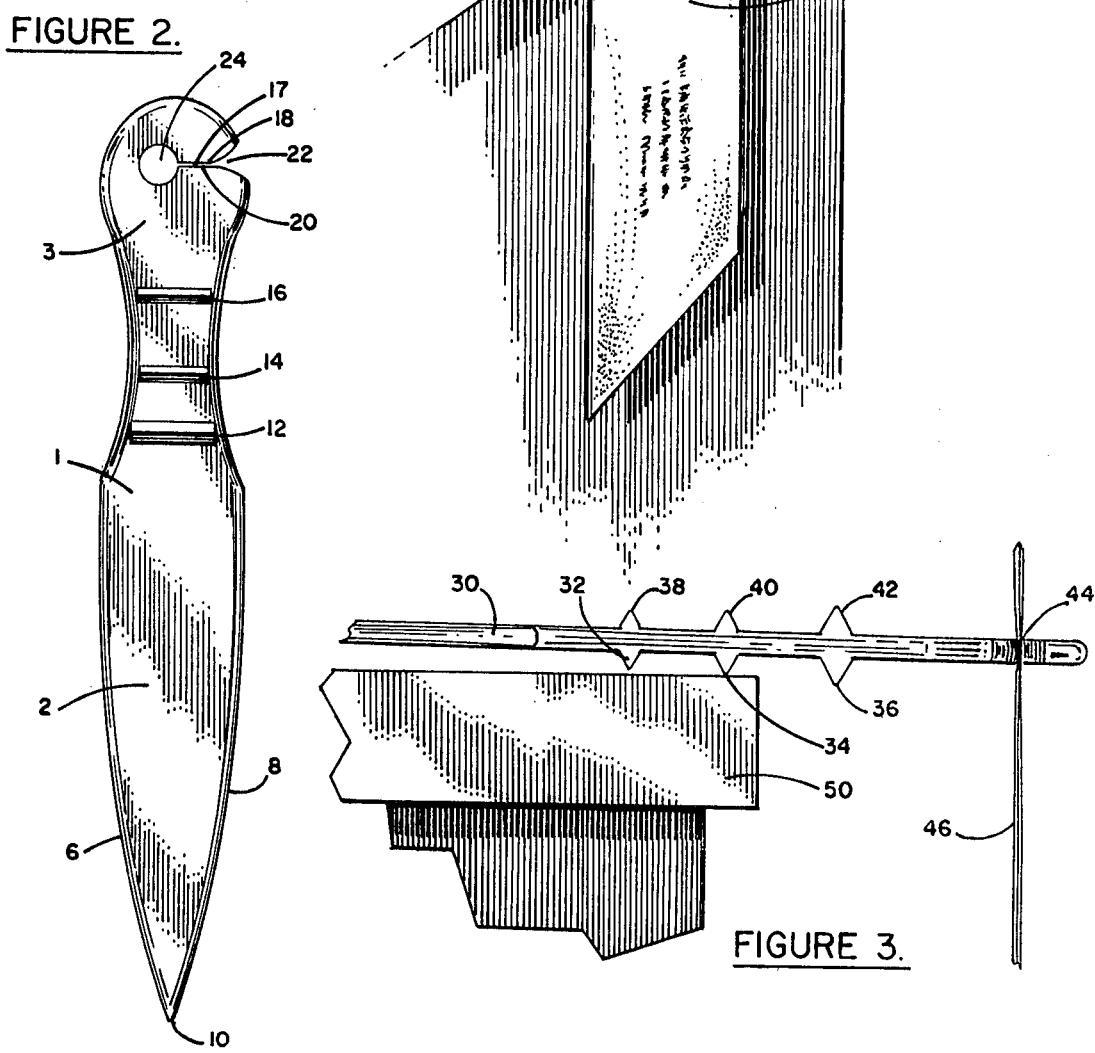

POSTAGE SCALE

BACKGROUND OF THE INVENTION

This invention relates to a device which is useful as a postage scale, and may also function as a letter opener.

Because the cost of mailing letters and other similar articles varies with the weight of the article, it is necessary prior to mailing to weigh the article to determine the proper amount of postage. Since postage scales are frequently not available at the time one wishes to post a letter, it is not uncommon for a person to apply excess postage to a letter simply to be sure that sufficient postage exists. This practice can be wasteful, particularly in those instances when the addition of an extra stamp results in doubling the cost of mailing a letter. Since even relatively simple postage scales are quite expensive, however, most individuals persist in the practice of simply adding an extra stamp or two if they are at all unsure as to whether a letter exceeds the limit for minimum postage.

The concept of combining a simple postage scale with a letter opener is not new. In Story, U.S. Pat. No. Des. 30,977, a stiletto-type paper cutter is disclosed having a pair of pointed edges on the underside which serve as a fulcrum to determine the weight of a letter. The letter is apparently fitted into one of a series of slots located at various distances from the fulcrum to determine its weight. The accuracy of this device is not particularly good, since the slots located on the top of the device are slanted and letters inserted in the slots tend to exert a torque which can affect the balance point. In addition, letters which are very flexible in nature, i.e., not structurally rigid, tend to bend and fold when inserted in the slots, thereby creating problems in tipping of the device.

It is an object of the present invention to provide a combination of a letter opener and a simple postage scale which can provide quick and accurate determinations as to whether an item to be mailed exceeds certain weights which correspond to increases in postage levels. It is another object of the invention to provide a combination of letter opener and scale which is accurate yet very easy and inexpensive to manufacture. These and other objects of the invention will be clear from the following detailed description of several preferred embodiments thereof.

BRIEF SUMMARY OF THE INVENTION

A device useful as a postage scale comprises a generally flat elongate body portion having a blade at one end portion thereof, a plurality of transverse balancing means located along the length of the member, and grip means for holding a thin flat article to be weighed at right angles to the body portion.

BRIEF DESCRIPTON OF THE DRAWINGS

The invention is best understood with reference to the drawings, in which:

FIG. 1 is a perspective view of a device of the invention in use to determine the weight of a letter;

FIG. 2 is a bottom view thereof; and

FIG. 3 is a partial side view of another embodiment of the invention, shown holding a letter in balance.

DETAILED DESCRIPTION OF THE INVENTION

Referring to FIG. 1, the scale/opener 1 is shown in use with a letter 5 being held in the grip means 4, and with a handle portion of the device extending outwardly over the edge of a table or desk 26. The device consists of an elongate knife-like instrument having a pointed blade portion 2 and a scale portion 3 at the opposite end of the device from the letter opening end.

As best seen in FIG. 2, the letter-opening portion of the device 2 consists of a flat bladed member having slightly curved opposing bladed edges 6 and 8 which converge near the end of the device to form point 10. The blade portion of the device is a generally standard configuration for a letter opener. At the opposite end of the letter opener is a scale portion 3 which consists of grip means 4 for holding a letter or similar article and a plurality of balancing means located along a neck portion of the device intermediate the blade member and the grip means. The grip means as shown in FIG. 2 consists substantially of a transverse slot formed by edges 18 and 20 which terminates in a bore 24 extending through the body of the flat member. The slot 17 intersects the bore 24 approximately along a center line which bisects lengthwise the entire bladed member. This design precludes the device from wobbling from side to side as balance is achieved during the weighing process. The slot 17 terminates at its outer end in a mouth 22 which is substantially wider than the body of the slot, thereby serving as a guide means to direct the edge of an envelope into the slot. An envelope or other article is forced into the slot until the edges 18 and 20 grip the item by inherent frictional resistance of the device. As an envelope is forced into the slot, the thickness of the envelope tends to force the edges 18 and 20 apart, and the inherent resiliency of the device holds the article in place. Envelopes which are very thin at the outer edge can be drawn through the slot until the edge abuts th rear wall of the bore 24; at this point, a thicker portion of the envelope will have entered the gripping portion of the slot 17 and the envelope will be held firmly in place. Th grip means holds the article to be weighed at right angles to the body of the device; this is very important for accuracy.

The balancing means comprises a plurality of V-shaped transverse ribs 12, 14, and 16 which are located at varying distances from the grip means. These transverse ribs are parallel to each other and each serves as a fulcrum for balancing articles of different weights. Each rib corresponds to a predetermined weight and will precisely balance an article of such weight when the article depends perpendicularly from the gripping slot. The device is marked adjacent to each rib with the quantity of balanced weight corresponding to the rib. As indicated in FIG. 1, ribs 12, 14, and 16 correspond to ½ ounce, 1 ounce, and 2 ounces in weight. To use the device, it is merely necessary to slide an envelope to be weighed into the grip means, and to place the device as shown in FIG. 1 on a flat surface with the gripping portion extending over the edge of the surface. If the envelope 5 in FIG. 1 weighs exactly 2 ounces, the device will balance precisely on rib 16. If the envelope exceeds 2 ounces, the device will tip over the edge of the table. If the letter is less than 2 ounces, the body portion 2 of the device will remain resting on the table. In this latter instance, the device is extended outwardly over the edge of the table until rib 14 is in the position now occupied by rib 16, and the test is repeated. While the envelope in FIG. 1 is shown with its bottom edge parallel to the ground, it is frequently convenient simply to grip a corner of the envelope in the grip means 4, with the envelope hanging in a skewed position. The accuracy of the scale is not affected by the position assumed by the envelope.

Another embodiment of the invention is shown in FIG. 3. In this embodiment, a letter opener/scale 30 of the invention is shown having transverse V-shaped ribs 38, 40, and 42 on one side of the flat elongate member, and corresponding ribs 32, 34, and 36 on the other side of the member. The existence of balancing means on each side of the generally flat body permits the slot opening of the grip means to be faced either to the left or to the right of the user as he faces the table, depending on the preference of the user.

Another important preferred aspect of the invention is to provide ribs having slightly increased heights for larger weight measurements. In other words, ribs 36 and 42, corresponding to a 2 ounce balance, are slightly larger than ribs 34 and 40, corresponding to a 1 ounce balance, and the latter are in turn slightly larger than ribs 32 and 38, which correspond to a ½ ounce weight. The difference in height of the ribs permits a very accurate balance to be obtained at each weight level; a perfect balance is obtained when the object being weighed raises the body of the blade from the surface of the table only very slightly e.g., sufficiently to make the surface of the blade exactly parallel to the surface of the table. An example is shown in FIG. 3, in which letter 46 is mounted in grip 44 and weighs precisely 1 ounce. The device of the invention is balanced along the edge of fulcrum 34, raising the body of the blade 30 parallel to the table top. Since the rib 32 is of slightly less height than rib 34, it has also raised from the table top. Accordingly, when the device of the invention rests on a table when it is not in use it attains a slighty slanted configuration with the blade tip touching the table and the grip portion of the elongate member slightly elevated from the table. In general, the difference in height of the various ribs is relatively small, on the order of about 1/32".

The scale/letter opener of the invention is very easy to manufacture by conventional techniques and can be made from any material, but is preferably molded plastic. While a preferred configuration of the grip means is shown, it may be any means which can easily and conveniently hold a letter such that the letter will not fall from the grip means of its own weight, and which will not damage the letter. The balancing means, which are shown herein as V-shaped spaced parallel ribs, may also assume any configuration which will act as a fulcrum when set near the edge of a table as shown in FIG. 3. The balancing edge of the rib may be rounded, if desired, or the ribs may be replaced by a single projection or pluralities of projections. In the alternative, the balancing means may comprise a notch or V-shaped channel which extends transversely across the body rather then extending outwardly from the body as shown in the drawings. In this event, the channel is placed over the edge of the table to balance the device.

Accordingly, it is apparent that a number of modifications may be made within the spirit and scope of the invention, which should not be limited by the disclosure of the specific embodiment herein but rather should be limited only by the following claims.

I claim:
1. A scale/letter opener device comprises an elongate, generally flat body member, a handle portion, a blade portion,
   grip means for holding a thin, flat article comprising a transverse slot extending from an edge of the handle portion to a central portion of the handle portion, and a bore through said handle portion at the termination of the slot, the slot intersecting the bore at approximately a centerline bisecting the device lengthwise, the slot having a mouth portion located at the edge of the device and a frictional gripping portion, said mouth portion having an opening substantially larger than the grip portion and serving as guide means for intersecting an article into the slot, and
   a plurality of transverse ribs extending substantially across the width of the body member on each side of the body member located at differing distances from the grip means along the body member, and wherein the ribs located closer to the grip means are greater in height than ribs located further from the grip means.
   * * * * *